United States Patent
Brown et al.

(10) Patent No.: US 8,621,879 B2
(45) Date of Patent: Jan. 7, 2014

(54) AIR CONDITIONING SYSTEM RECHARGING METHOD AND APPARATUS

(75) Inventors: William Brown, Owatonna, MN (US); Mark McMasters, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 867 days.

(21) Appl. No.: 12/718,038

(22) Filed: Mar. 5, 2010

(65) Prior Publication Data
US 2011/0214436 A1 Sep. 8, 2011

(51) Int. Cl.
- F25B 45/00 (2006.01)
- F25B 49/00 (2006.01)
- G01K 13/00 (2006.01)
- B65B 1/30 (2006.01)
- B65B 31/00 (2006.01)
- B65B 3/00 (2006.01)
- B67D 1/00 (2006.01)
- B67D 7/22 (2010.01)

(52) U.S. Cl.
USPC ........ 62/77; 62/292; 62/149; 62/127; 62/129; 141/83; 141/94; 141/197; 222/55; 222/57; 222/58; 222/36

(58) Field of Classification Search
USPC ............ 62/77, 292, 149, 127, 129, 6; 222/52, 222/55, 57, 58, 36, 37, 43, 44, 64, 50, 51; 141/153, 37, 83, 94, 95, 102, 197
See application file for complete search history.

(56) References Cited

U.S. PATENT DOCUMENTS

2006/0101835 A1* 5/2006 Meldahl et al. ............... 62/149
2009/0008859 A1* 1/2009 Fairweather et al. ........ 271/9.06

* cited by examiner

Primary Examiner — Frantz Jules
Assistant Examiner — Erik Mendoza-Wilkenfel
(74) Attorney, Agent, or Firm — Baker & Hostetler LLP

(57) ABSTRACT

A method of charging or recharging an air conditioning wherein an initial amount of refrigerant is introduced, followed by additional introductions of refrigerant during injection pulses. The pulse periods are adjusted dynamically during the charging/recharging process based on feedback obtained after each pulse related to how much refrigerant was transferred during the previous pulse. Also, a system for implementing the above-mentioned method.

17 Claims, 3 Drawing Sheets

AIR CONDITIONING SYSTEM RECHARGING METHOD AND APPARATUS

FIELD OF THE INVENTION

The present invention relates generally to methods for charging and/or recharging air conditioning systems. The present invention also relates generally to devices and/or systems for charging and/or recharging air conditioning systems.

BACKGROUND OF THE INVENTION

Air conditioning systems are currently commonplace in homes, office buildings and a variety of vehicles including, for example, automobiles. Over time, the refrigerant included in these systems often gets depleted and/or contaminated. As such, in order to maintain the overall efficiency and efficacy of the air conditioning system, the refrigerant may be periodically recharged.

Currently available processes for recharging air conditioning systems typically include placing refrigerant in a recharging unit, connecting the recharging unit to an air conditioning system and transferring the refrigerant from the recharging unit to the air conditioning system. More specifically, some currently available recharging units include a refrigerant-containing reservoir, a scale that supports and monitors how much refrigerant is in the reservoir and a valve that regulates the rate at which the refrigerant flows out of the reservoir.

In operation, such a recharging unit initially charges the air conditioning system to within a certain amount of the optimal (e.g., manufacturer recommended) charge amount for the air conditioning system in question. Then, the recharging unit continues the charging process by periodically opening the valve in short pulses of a predetermined length. Subsequent to each pulse, a scale reading is taken and the amount of refrigerant that has been transferred out of the reservoir is determined. These pulses continue until the optimal charge for the air conditioning system in question has been achieved.

The above-discussed recharging systems and methods have proven to be relatively accurate but also relatively slow. This is particularly true as the target level of charge is approached since the pressures in the reservoir and in the air conditioning system sometimes nearly equalize. As such, in some instances, the recharging unit may pulse for one minute or more. In other instances, due at least in part to the ideal-gas-law-related changes in temperature associated with pressure changes as the refrigerant enters the air conditioning system and exits the recharging unit, the recharging unit may never attain the target level of charge.

SUMMARY OF THE INVENTION

At least in view of the above, it would be desirable to provide novel methods of charging and/or recharging air conditioning systems with greater speed and accuracy. It would also be desirable to provide novel devices and/or systems capable of implementing such methods.

The foregoing needs are met, to a great extent, by one or more embodiments of the present invention. According to one such embodiment, a method of charging an air conditioning system is provided. The method includes determining a desired amount of refrigerant to be used in the air conditioning system and transferring less than the desired amount of the refrigerant to the air conditioning system. The method also includes adding an incremental amount of the refrigerant to the air conditioning system during an initial pulse period and dividing a value representing a remaining amount of the refrigerant needed to attain the desired amount by a value representing the incremental amount of the refrigerant to obtain a result. In addition, the method further includes multiplying the result by the initial pulse period to determine a subsequent pulse period and adding a subsequent incremental amount of the refrigerant to the air conditioning system during the subsequent pulse period.

In accordance with another embodiment of the present invention, an air conditioning recharging system is provided. The system includes a refrigerant reservoir configured to contain a refrigerant and a sensor configured to monitor how much of the refrigerant is in the reservoir. The system also includes an input device configured to receive information about a desired amount of the refrigerant to be used in an air conditioning system of a vehicle and a connector configured to be attached to the air conditioning system of the vehicle and to transfer the refrigerant to the air conditioning system. In addition, the system further includes a valve configured to control flow of the refrigerant between the recharging system and the air conditioning system, an actuator configured to control the valve and a processor that is in communication with the input device, the sensor and the actuator. According to this embodiment, the processor is configured to signal the actuator to open the valve for an initial loading period such that less than the desired amount of the refrigerant is transferred to the air conditioning system. The processor is also configured to signal the actuator to open the valve for an initial pulse period such that an incremental amount of the refrigerant is added to the air conditioning system. The processor is further configured to obtain information from the sensor regarding how much of the refrigerant was transferred to the air conditioning system during the initial loading period and during the initial pulse period. In addition, the processor is also configured to divide a value representing a remaining amount of the refrigerant needed to attain the desired amount by a value representing the incremental amount of the refrigerant to obtain a result. Then, the processor is also configured to multiply the result by the initial pulse period to determine a subsequent pulse period and to signal the actuator to open the valve for the subsequent pulse period such that a subsequent incremental amount of the refrigerant has been added to the air conditioning system.

In accordance with yet another embodiment of the present invention, another air conditioning recharging system is provided. The system includes means for determining a desired amount of refrigerant to be used in an air conditioning system and means for transferring less than the desired amount of the refrigerant to the air conditioning system. The system also includes means for adding an incremental amount of the refrigerant to the air conditioning system during an initial pulse period and means for dividing a value representing a remaining amount of the refrigerant needed to attain the desired amount by a value representing the incremental amount of the refrigerant to obtain a result. In addition, the system includes means for multiplying the result by the initial pulse period to determine a subsequent pulse period and means for adding a subsequent incremental amount of the refrigerant to the air conditioning system during the subsequent pulse period.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
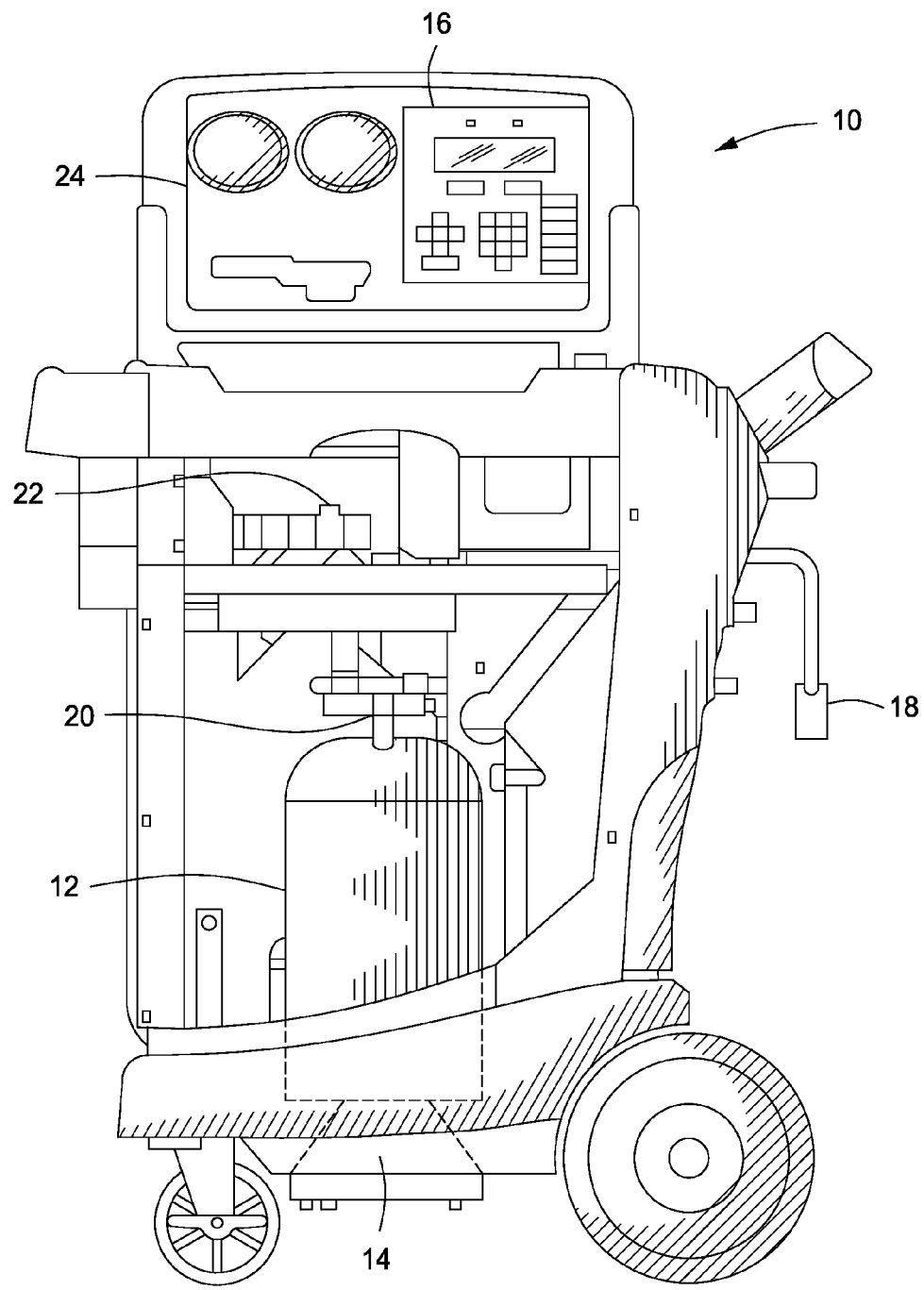
FIG. 1 is a schematic representation of an air conditioning recharging system according to one embodiment of the present invention.
Figure 2:
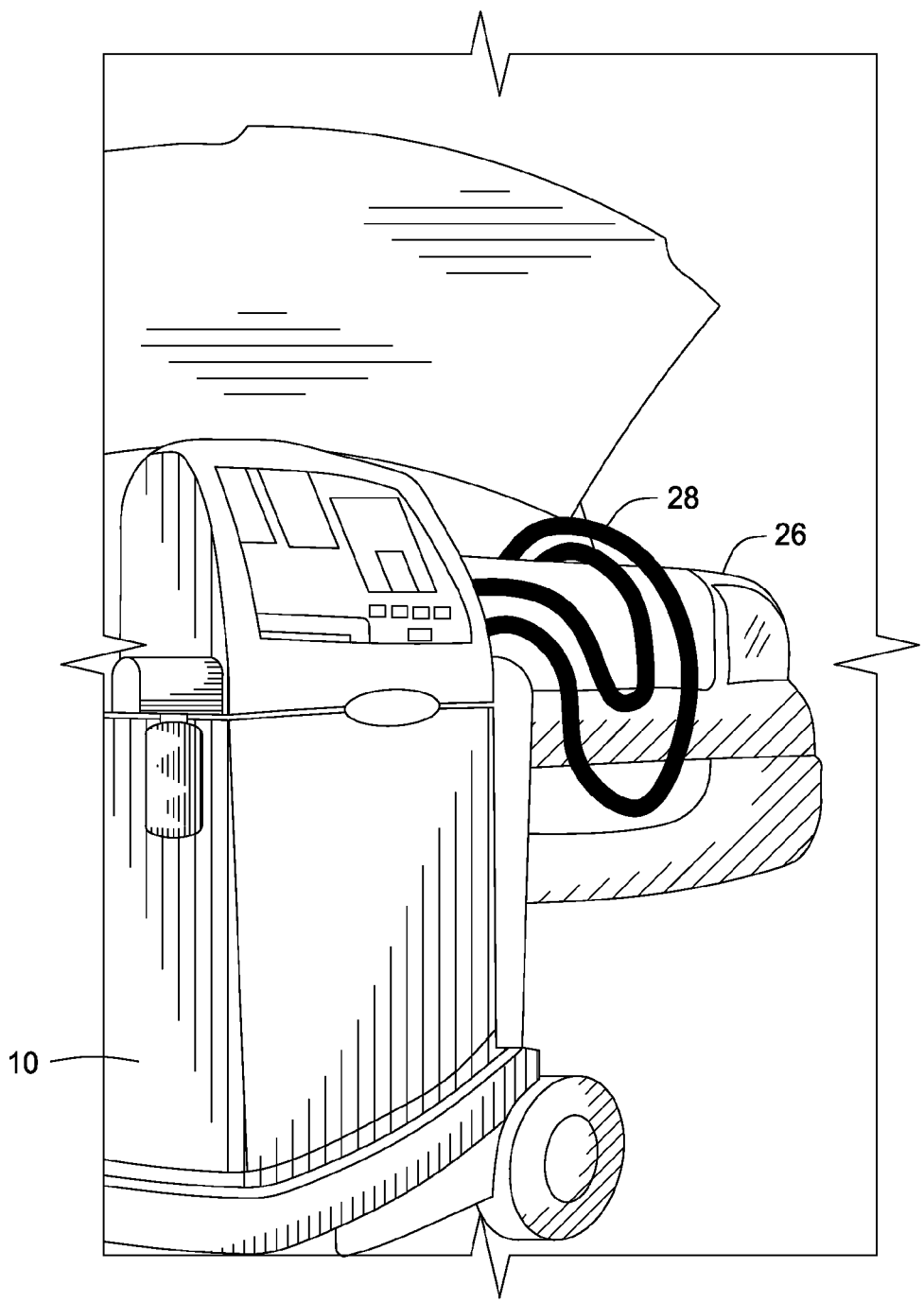
FIG. 2 is an illustration of the air conditioning recharging system illustrated in FIG. 1 as connected to a vehicle.

The invention will now be described with reference to the drawing figures, in which like reference numerals refer to like parts throughout. FIG. 1 is a schematic representation of an air conditioning recharging system 10 according to one embodiment of the present invention. As illustrated in FIG. 1, the recharging system 10 includes a refrigerant reservoir 12, a sensor 14, an input device 16, a connector 18, a valve 20, an actuator 22 and a processor 24. FIG. 2 illustrates the air conditioning recharging system 10 illustrated in FIG. 1 as it is connected to a vehicle 26 via a pair of hoses 28.

The refrigerant reservoir 12 illustrated in FIG. 1 is configured to contain a refrigerant. No limitations are placed on the kind of refrigerant that may be used according to the present invention. As such, any refrigerant that is commonly available (e.g., R-134a) may be added to the reservoir 12. However, according to certain embodiments of the present invention, the reservoir 12 is particularly configured to accommodate refrigerants that are commonly used in the air conditioning systems of vehicles (e.g., cars, trucks, boats, etc.).

The above-mentioned sensor 14 is configured to monitor how much refrigerant is contained in the reservoir 12 at a given time. As illustrated in FIG. 1, the sensor 14 may take the form of a scale upon which the reservoir 12 sits. In such embodiments, since the density of the refrigerant added to the reservoir 12 is typically readily available, calculating how much refrigerant is in the reservoir 12 based upon weight is a straightforward calculation. However, other embodiments of the invention allow for other types of sensors to be used. For example, a flow meter may be used to monitor how much refrigerant is transferred out of the reservoir 12.

The input device 16 illustrated in FIG. 1 is configured to receive information about a desired amount of the refrigerant to be used in the air conditioning system of the vehicle 26 illustrated in FIG. 2. Typically, this desired amount coincides with the manufacturer's recommended operating amount for the air conditioning system in question. This value may typically be found at least in the air conditioning system's technical manual.

When the input device 16 takes the form of a keypad as illustrated in FIG. 1, an operator of the recharging system 10 (e.g., a mechanic) may, for example, simply type in the desired amount after looking it up in the technical manual. According to other embodiments of the present invention, the input device 16 includes a data port used to download information about a wide array of vehicles to the system 10. In such embodiments, the downloaded information is stored within a memory device included in the recharging system 10. Then, the mechanic uses the keypad to select the parameters of the vehicle 26 (e.g., make, model, year) and the recharging system 10 determines the desired amount internally. According to still other embodiments of the present invention, the input device 16 is electronically connected to the on-board computer of the vehicle 26 and the on-board computer informs the recharging system of the value of the desired amount.

As illustrated in FIGS. 1 and 2, the connector 18 is configured to be attached to the air conditioning system of the vehicle 26 and to transfer the refrigerant from the reservoir 12 to the air conditioning system. One or more extensions (e.g., the hoses 28 illustrated in FIG. 2) may be connected to the connector 18. Typically, this promotes convenient, safe and effective flow of the refrigerant from the recharging system 10 to the air conditioning system of the vehicle 26.

The valve 20 illustrated in FIG. 1 is configured to control flow of the refrigerant between the recharging system 10 and the air conditioning system of the vehicle 26. According to certain embodiments of the present invention, the valve 20 is a solenoid valve. However, the use of other types of valves and/or the use of systems including multiple valves is also within the scope of the present invention.

The actuator 22 illustrated in FIG. 1 is configured to control the valve 20 also illustrated therein. When a flow-regulation system including multiple valves is included in the recharging system 10, the actuator 22 may control either portions of or the entire system.

In addition to the above-discussed components, FIG. 1 also illustrates a processor 24 that is in communication with the input device 16, the sensor 14 and the actuator 22. As will be discussed in greater detail below, while the recharging system 10 is in operation, the processor 24 communicates with (e.g., obtains information from) the input device 16 and/or the sensor 14 and controls the actuator 26, thereby effectively also controlling any valves 26 included in the recharging system 10. No particular restrictions are placed on the circuitry that may be used to implement the processor 24, so long as the processor 24 is capable of communicating and/or controlling with the input device 16, sensor 14 and actuator 22. Also, according to certain embodiments of the present invention, the processor 24 is configured to be able to implement one or more steps of methods of charging/recharging air conditioning systems according to the present invention, including those discussed below.

Figure 3:
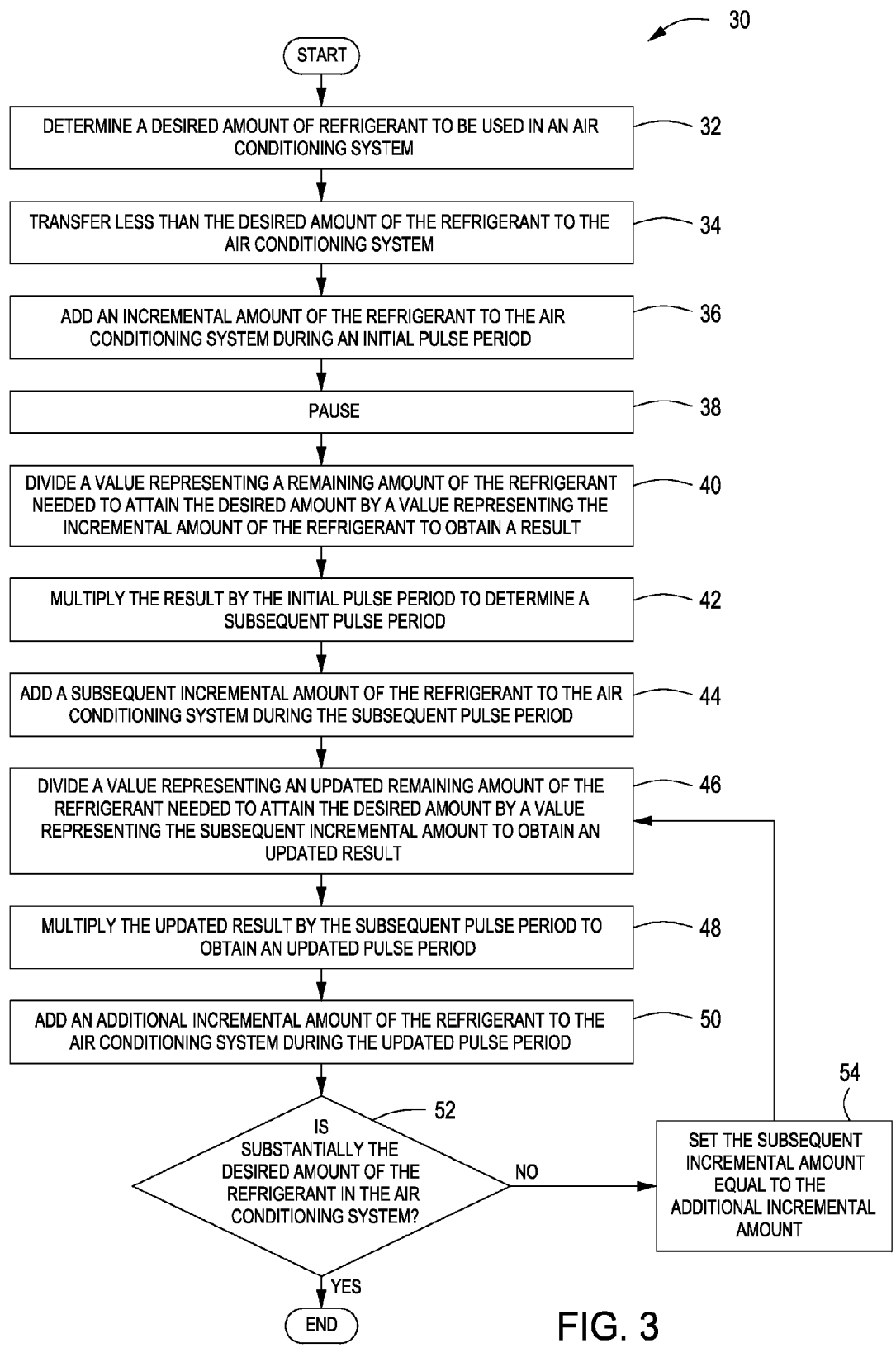
FIG. 3 is a flowchart illustrating steps of a method of charging an air conditioning system according an embodiment of the present invention.

FIG. 3 is a flowchart 30 illustrating the steps of a method of charging an air conditioning system according to an embodiment of the present invention. According to certain embodiments of the present invention, one or more of the steps included in the flowchart 30 may be implemented using components contained within the air conditioning recharging system 10 illustrated in FIGS. 1 and 2, particularly by the processor 24.

The first step of the flowchart in FIG. 3 (i.e., step 32) specifies determining the desired amount of refrigerant to be used in the air conditioning system that is being charged or recharged. As discussed above, the desired amount typically coincides with the air conditioning system manufacture's recommended amount for optimal performance. According to certain embodiments of the present invention, the implementation of step 32 includes obtaining information about the desired amount of refrigerant from an outside source (e.g., a vehicle's on-board computer or a technical manual offered by the manufacturer of the air conditioning system).

The second step of the flowchart (i.e., step 34) specifies transferring less than the desired amount of the refrigerant to the air conditioning system. In other words, in order to avoid over-filling of the air conditioning system connected to the recharging system 10, an amount of refrigerant intentionally selected as being below the desired is transferred into the air conditioning system. According to certain embodiments of the present invention, step 34 is implemented by transferring approximately 5% less than the desired amount of refrigerant into the air conditioning system. According to other embodiments of the present invention, the transferring step 34 includes transferring approximately 27 grams less than the desired amount to the air conditioning system.

Although certain embodiments of the present invention utilize the transferring step 34 to add refrigerant to the air conditioning system of a vehicle (e.g., an automobile, a truck, a boat, an airplane), this is not particularly limiting of the present invention. Rather, the scope of the present invention also includes the charging and/or recharging of air conditioning systems of more static items (e.g., homes, commercial buildings, etc.).

Step 36 of the flowchart 30, which is typically performed after step 34 has been performed, specifies adding an incremental amount of the refrigerant to the above-mentioned air conditioning system during an initial pulse period. According to certain embodiments of the present invention, the initial pulse period is selected to be substantially equal to or less than 100 milliseconds. For example, the initial pulse period is sometimes selected to be substantially equal to or less than 18 milliseconds. Also, the adding step 36 sometimes includes transferring the refrigerant to the air conditioning system from a container (e.g., the refrigerant reservoir 12 illustrated in FIG. 1) that is positioned upon a weighing device (e.g., the sensor 14 also illustrated in FIG. 1).

Step 38 of the flowchart 30 next specifies pausing pursuant to step 36. Typically, this pause allows the above-mentioned weighing device to more accurately weigh the container. In other words, according to certain embodiments of the present invention, after the pulse period, the refrigerant remaining in the refrigerant reservoir 12 is allowed to settle. Although this pause may be for less than 1 second and may sometimes be on the order of tens or hundreds of milliseconds, other pause lengths (including no pause at all), are also within the scope of the present invention.

When implementing the above-discussed steps of the flowchart 30 using the processor 24 illustrated in FIG. 1, the processor 24 may signal the actuator 22 to open the valve 20 for an initial loading period such that less than the desired amount of the refrigerant (e.g., 27 grams less than the desired amount) gets transferred to the air conditioning system of the vehicle 26 illustrated in FIG. 2. Then, the processor 24 may signal the actuator 22 to open the valve for an initial pulse period (e.g., 18 milliseconds) such that an incremental amount of the refrigerant is added to the air conditioning system. Afterwards, the processor 24 may obtain information from the sensor 14 regarding how much of the refrigerant was transferred to the air conditioning system during the initial transferring/loading period and during the subsequent initial pulse period. At least some of this information may be obtained pursuant to the above-mentioned pause period to increase sensor accuracy.

Step 40 of FIG. 3 next specifies dividing a value representing a remaining amount of the refrigerant needed to attain the desired amount by a value representing the incremental amount of the refrigerant added during the above-discussed pulse to obtain a result. In other words, according to certain embodiments of the present invention, the weight of the additional refrigerant needed to "fill up" the air conditioning system is divided by the weight of the incremental amount of refrigerant that was added during step 36. When implementing step 40 using the recharging system 10 illustrated in FIG. 1, the processor 24 may be configured to collect the weight data from the sensor 14 and to perform the subsequent division.

Step 42 of the flowchart 30 next specifies multiplying the result obtained while implementing step 40 by the initial pulse period in order to determine a subsequent pulse period for additional charging. According to certain embodiments of the present invention, steps 40 and 42 may be illustrated via the following equation:

$$\text{subsequent\_pulse} = \frac{\text{amt\_of\_charge\_remaining}}{\text{start\_wt} - \text{finish\_wt}} * \text{initial\_pulse}$$

When implementing step 42 using the processor 24 of the recharging system 10 illustrated in FIG. 1, the processor 24 may be configured to do the above-discussed multiplication.

The next step illustrated in flowchart 30 (i.e., step 44) specifies adding a subsequent incremental amount of the refrigerant to the air conditioning system during the subsequent pulse period. When implementing step 44 using the above-discussed recharging unit 10, the processor 24 typically signals the actuator 22 to open the valve 20 for the subsequent pulse period in order to ensure that the subsequent incremental amount of the refrigerant has been added to the air conditioning system of the vehicle 26. Although not explicitly illustrated in FIG. 3, according to certain embodiments of the present invention, a pause period analogous to the one specified in step 38 may be implemented pursuant to step 44. The primary benefit of this second pause period would again be increasing the accuracy of the subsequent weight reading by the sensor 14.

Step 46 next specifies dividing a value representing an updated remaining amount of the refrigerant needed to attain the desired amount by a value representing the subsequent incremental amount to obtain an updated result. Then, step 48 specifies multiplying the updated result by the subsequent pulse period to obtain an updated pulse period and step 50 specifies adding an additional incremental amount of the refrigerant to the air conditioning system during the updated pulse period. When implemented using the recharging system 10 illustrated in FIG. 1, the processor 24 may be configured to perform the mathematical steps recited in steps 46 and 48 after having received information from the sensor 24 and may implement step 50 by re-signaling the actuator 22 to open the valve 20 for the updated pulse period such that the additional incremental amount of the refrigerant is added to the air conditioning system of the vehicle 26.

After step 50 has been performed, step 52 questions whether or not the desired amount is at least substantially in the air conditioning system pursuant to step 50. If the total amount of added refrigerant is at least substantially equal to the desired amount, then the process illustrated in flowchart 30 ends. However, if additional refrigerant needs to be added, then, according to step 54, the subsequent incremental amount is set equal to the additional incremental amount and steps 44 through 54 are iteratively repeated until the desired amount has been added.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of charging an air conditioning system, the method comprising:
   determining a desired amount of refrigerant to be used in the air conditioning system;
   transferring less than the desired amount of the refrigerant to the air conditioning system;
   adding an incremental amount of the refrigerant to the air conditioning system during an initial pulse period;
   dividing a value representing a remaining amount of the refrigerant needed to attain the desired amount by a value representing the incremental amount of the refrigerant to obtain a result;
   multiplying the result by the initial pulse period to determine a subsequent pulse period;
   adding a subsequent incremental amount of the refrigerant to the air conditioning system during the subsequent pulse period;
   dividing a value representing an updated remaining amount of the refrigerant needed to attain the desired amount by a value representing the subsequent incremental amount to obtain an updated result;
   multiplying the updated result by the subsequent pulse period to obtain an updated pulse period; and
   adding an additional incremental amount of the refrigerant to the air conditioning system during the updated pulse period.

2. The method of claim 1, further comprising:
   setting the subsequent incremental amount equal to the additional incremental amount; and
   iteratively repeating the dividing, multiplying and adding steps until substantially the desired amount of the refrigerant is in the air conditioning system.

3. The method of claim 1, wherein the determining step comprises obtaining information about the desired amount of refrigerant from an outside source.

4. The method of claim 1, wherein the transferring step comprises transferring approximately 5% less than the desired amount.

5. The method of claim 1, wherein the transferring step comprises transferring approximately 27 grams less than the desired amount.

6. The method of claim 1, wherein the adding step comprises transferring the refrigerant to the air conditioning system from a container in a recharging system that is positioned upon a weighing device.

7. The method of claim 6, further comprising:
   pausing after the adding step in order to allow the weighing device to more accurately weigh container.

8. The method of claim 1, wherein the initial pulse period is less than 100 milliseconds.

9. The method of claim 8, wherein the initial pulse period is substantially equal to 18 milliseconds.

10. The method of claim 1, wherein the transferring step comprises transferring the refrigerant to the air conditioning system of a vehicle.

11. The method of claim 10, wherein the transferring step comprises transferring the refrigerant to the air conditioning system of an automobile.

12. An air conditioning recharging system, the system comprising:
   a refrigerant reservoir configured to contain a refrigerant;
   a sensor configured to monitor how much of the refrigerant is in the refrigerant reservoir;
   an input device configured to receive information about a desired amount of the refrigerant to be used in an air conditioning system of a vehicle;
   a connector configured to be attached to the air conditioning system of the vehicle and to transfer the refrigerant to the air conditioning system;
   a valve configured to control flow of the refrigerant between the recharging system and the air conditioning system;
   an actuator configured to control the valve; and
   a processor that is in communication with the input device, the sensor and the actuator, wherein the processor is configured to:
      signal the actuator to open the valve for an initial loading period such that less than the desired amount of the refrigerant is transferred to the air conditioning system, signal the actuator to open the valve for an initial pulse period such that an incremental amount of the refrigerant is added to the air conditioning system,
      obtain information from the sensor regarding how much of the refrigerant was transferred to the air conditioning system during the initial loading period and during the initial pulse period,
      divide a value representing a remaining amount of the refrigerant needed to attain the desired amount by a value representing the incremental amount of the refrigerant to obtain a result,
      multiply the result by the initial pulse period to determine a subsequent pulse period,
      signal the actuator to open the valve for the subsequent pulse period such that a subsequent incremental amount of the refrigerant has been added to the air conditioning system;
      divide a value representing an updated remaining amount of the refrigerant needed to attain the desired amount by a value representing the subsequent incremental amount to obtain an updated result;
      multiply the updated result by the subsequent pulse period to obtain an updated pulse period; and
      re-signal the actuator to open the valve for the updated pulse period such that an additional incremental amount of the refrigerant is added to the air conditioning system.

13. The air conditioning system recharging system of claim 12, wherein the sensor is configured to weigh the refrigerant reservoir.

14. The air conditioning system recharging system of claim 12, wherein the valve comprises a solenoid valve.

15. The air conditioning system recharging system of claim 12, wherein the processor is further configured to:
   set the subsequent incremental amount equal to the additional incremental amount; and iteratively repeat the dividing, multiplying and re-signaling steps until substantially the desired amount of the refrigerant is in the air conditioning system.

16. An air conditioning recharging system, the system comprising:

means for determining a desired amount of refrigerant to be used in an air conditioning system;

means for transferring less than the desired amount of the refrigerant to the air conditioning system;

means for adding an incremental amount of the refrigerant to the air conditioning system during an initial pulse period;

means for dividing a value representing a remaining amount of the refrigerant needed to attain the desired amount by a value representing the incremental amount of the refrigerant to obtain a result;

means for multiplying the result by the initial pulse period to determine a subsequent pulse period;

means for adding a subsequent incremental amount of the refrigerant to the air conditioning system during the subsequent pulse period;

means for dividing a value representing an updated remaining amount of the refrigerant needed to attain the desired amount by a value representing the subsequent incremental amount to obtain an updated result;

means for multiplying the updated result by the subsequent pulse period to obtain an updated pulse period; and means for adding an additional incremental amount of the refrigerant to the air conditioning system during the updated pulse period.

17. The air conditioning recharging system of claim 16, further comprising: means for iteratively engaging the dividing means, multiplying means and adding means until substantially the desired amount of the refrigerant is in the air conditioning system.

* * * * *